Jan. 8, 1929.   1,698,024
H. ROSTER
RAISING DEVICE FOR PORTABLE CONVEYERS
Filed Jan. 15, 1927   2 Sheets-Sheet 1
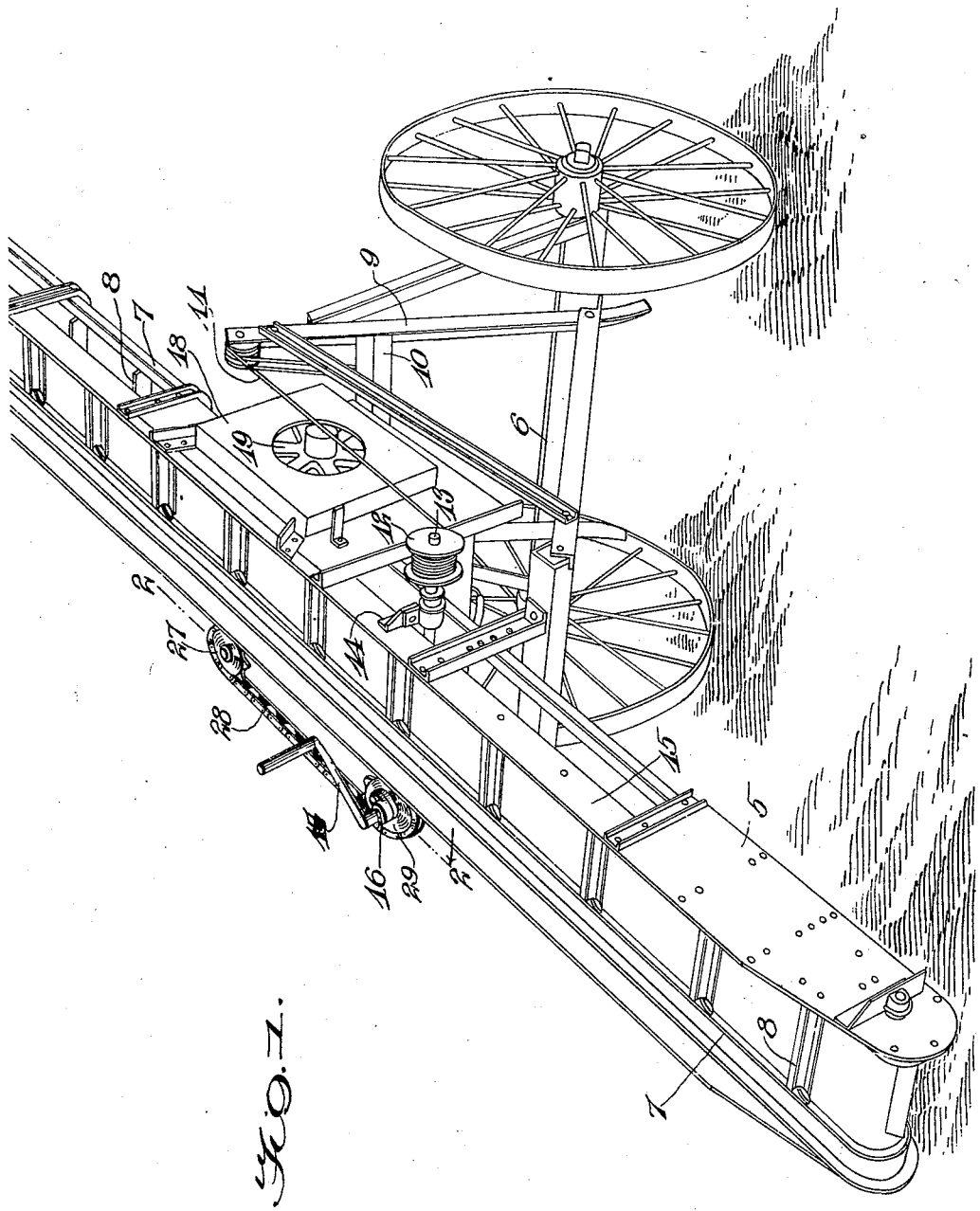
Inventor:
Henry Roster
By Milo B. Stevens Co.
Attorneys.

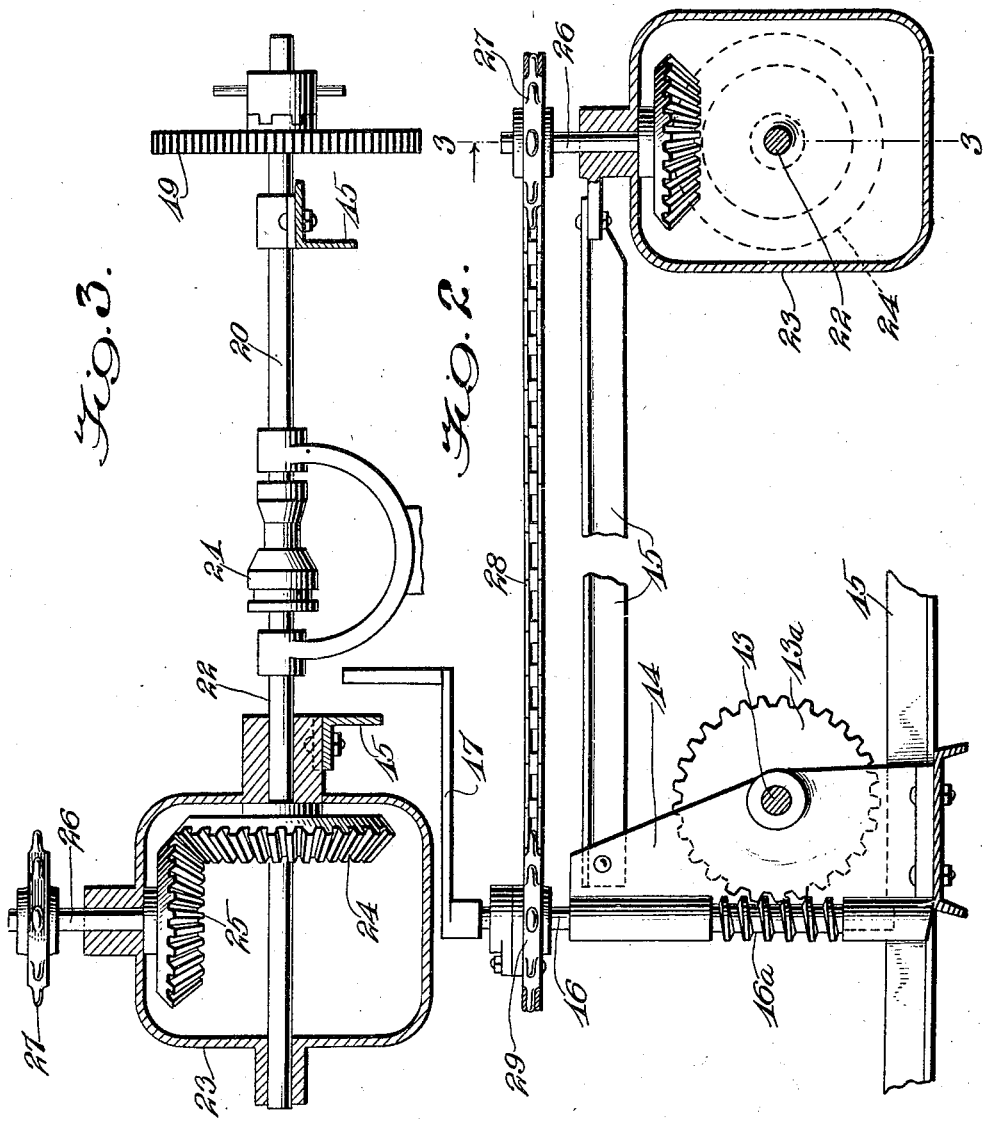

Patented Jan. 8, 1929.

1,698,024

UNITED STATES PATENT OFFICE.

HENRY ROSTER, OF OAK PARK, ILLINOIS.

RAISING DEVICE FOR PORTABLE CONVEYERS.

Application filed January 15, 1927. Serial No. 161,434.

This invention relates to portable conveyers of the type used for loading coal, building materials and the like into receptacles or enclosures, and my main object is to provide a gearing to effect the raising of such conveyers by power instead of by hand, as is the present practice.

A further object of the invention is to install the novel gearing in direct communication which the power element already on the machine, so that no radical changes in the design of the machine are necessary.

A still further object of the invention is to join the novel gearing with the gearing of the manual raising element, whereby to still make use of the latter gearing, saving the need of new parts in that connection.

Another object of the invention is to so design the same that the manual raising element is immediately available for use in case the supply of power is interrupted.

A final but nevertheless important object of the invention is to construct the novel gearing of few and simple parts, in order that its production and installation may not materially affect the price of the machine.

With the above objects in view and any others that may suggest themselves from the specification claims to follow, a better understanding of the invention may be gained by reference to the accompanying drawings, in which:—

Figure 1 is an incomplete perspective view of a typical portable conveyer showing a portion of the novel gearing prominently;

Fig. 2 is an enlarged section on the line 2—2 of Fig. 1; and

Fig. 3 is a section on the line 3—3 of Fig. 2.

Portable conveyers of the prevalent type have, according to the specific showing in the drawings, a long trough 5 supported in inclined position in a wheeled carriage 6. Chains 7 carrying flights 8 serve to move the material in which the lower end of the trough is placed toward the upper end, the latter not being fully illustrated. The lower end of the trough always rests on the ground or in the material, and the trough is suspended amidships in the carriage 6 in order to be raised or lowered for the adjustment of the angle thereof to the proper dumping height. The trough swings within the carriage standards 9 and has a cross beam 10 to which is connected the lifting tackle 11 leading from winch drums 12 at the sides of the machine. The winch drums 12 are carried by a cross-shaft 13 journaled in bearing plates 14 carried by longitudinal frame members 15 of the machine. The plates 14 also have bearings for a vertical shaft 16 cut with a worm $16^a$ to mesh with a gear $13^a$ on the shaft 13. The shaft 16 receives a crank handle 17 at its upper end.

The construction thus far described is practically standard and mainly features the apparatus for the raising and lowering of the trough by the turning of the crank handle 17 in one or the other direction. The connections for operating this apparatus by power will now be described.

Forward of the winch drums 12, the trough has a housing 18 for an electric or gasoline motor and suitable controls and connections with the conveyer chains 7 for the driving of the same. Of these parts but an intermediate gear 19 and its countershaft 20 need be shown for the present purpose. The countershaft 20 is connected by a clutch 21 to an extension shaft 22 leading into a gear box 23. In the latter, the extension shaft 22 carries a bevel gear 24 which meshes with a companion bevel gear 25 carried by a shaft 26 vertically extended through the top of the box 23. The outer end of this shaft carries a sprocket wheel 27 from which a chain 28 is passed to a companion sprocket wheel 29 mounted on the shaft 16 below the crank handle 17.

It will now be seen that when the motor is in operation, the clutch 21 may be engaged to put in motion the chain 28 for the operation of the shaft 16 and the balance of the trough-raising mechanism. Suitable controlling devices for the speed and direction of the power already being part of the equipment for the regulation of the conveyer chain operation, and not being directly incident to the operation of the novel gearing, need no illustration.

A raising device is thus had which is both simple and efficient, furnishes a short connection between the power element and the immediate raising gearing, yet enables the latter to be manually operated in the event that power is not available.

I claim:—

1. In a portable chain-conveyer, the combination with a power shaft in the drive for the chains and a crank shaft in the manual drive for raising the conveyer; of a clutch in the power shaft, a spindle parallel to the crank shaft, a gearing from the driven part of the clutch to the spindle, alined sprocket wheels on the spindle and crank shaft respectively, and a chain connecting the sprocket wheels.

2. In a portable chain conveyer, means for manually elevating the conveyer and including a shaft, a sprocket on said shaft, power driven means for operating the chains of said conveyer and including a shaft, a stub shaft mounted adjacent thereto, a sprocket on said stub shaft, a drive chain connecting both of said sprockets, and means for obtaining operative connection between said power drive shaft and said stub shaft for operating said elevating mechanism from the power drive.

In testimony whereof I affix my signature.

HENRY ROSTER.